United States Patent [19]

Hackett

[11] 4,223,399
[45] Sep. 16, 1980

[54] SEISMIC EXPLORATION METHOD

[75] Inventor: Gary K. Hackett, Fullerton, Calif.

[73] Assignee: Union Oil Company of California, Brea, Calif.

[21] Appl. No.: 923,896

[22] Filed: Jul. 12, 1978

Related U.S. Application Data

[63] Continuation-in-part of Ser. No. 743,929, Nov. 22, 1976, abandoned.

[51] Int. Cl.² ............................................. G01V 1/36
[52] U.S. Cl. ...................................... 367/41; 367/46; 364/421
[58] Field of Search ............... 340/15.5 TA, 15.5 SC, 340/15.5 IF, 7 R; 364/421, 574; 325/474, 476; 367/41, 46

[56] References Cited

U.S. PATENT DOCUMENTS

| | | | |
|---|---|---|---|
| 3,326,320 | 6/1967 | Forester | 340/15.5 F |
| 3,523,277 | 8/1970 | Landrum | 340/15.5 F |
| 3,622,970 | 11/1971 | Sayous | 340/15.5 SC |
| 3,689,874 | 9/1972 | Foster et al. | 340/15.5 F |
| 3,698,009 | 10/1972 | Barbier | 340/15.5 CP |
| 3,968,471 | 7/1976 | Savit | 340/15.5 PP |
| 4,037,190 | 7/1977 | Martin | 340/15.5 TA |
| 4,147,228 | 4/1979 | Bouyoucos | 340/15.5 TA |

OTHER PUBLICATIONS

Robinson, "Dynamic Predictive Deanvaluation", 6/75, pp. 780-798, Geophysical Prospecting, vol. 23.
Barbier et al., "Mini-SOSIE for Land Seismology", Geophysical Prospecting, vol. 24, 6/74, pp. 518-527.

*Primary Examiner*—Nelson Moskowitz
*Attorney, Agent, or Firm*—Dean Sandford; Daniel R. Farrell

[57] ABSTRACT

A seismic exploration method in which a coded energy signal is generated and transmitted into the earth, the seismic energy reflected from within the earth is sensed and sampled to form a raw trace, the raw trace is crosscorrelated with a record of the coded energy signal, and a predictive operator derived from the autocorrelation function of the coded energy signal is subtractively applied to the crosscorrelated trace to remove correlation residuals, and thereby produce a high quality processed trace. Geophysical principles are used to interpret the processed trace and identify subterranean mineral deposits of interest. Based on this interpretation at least one well is drilled to further explore and/or develop the mineral deposits of interest.

20 Claims, 35 Drawing Figures

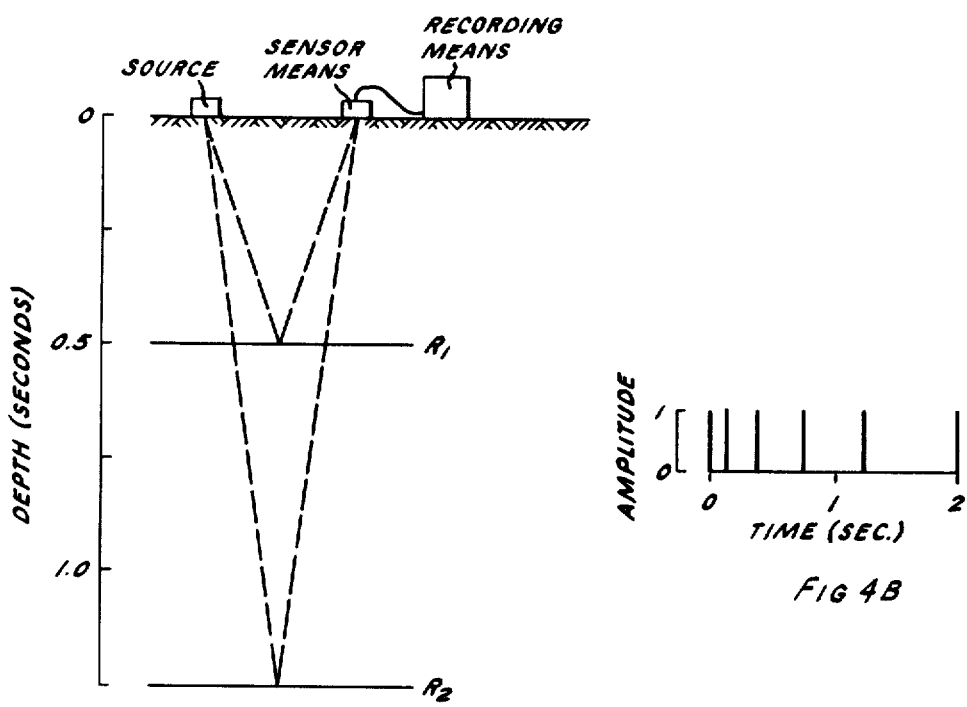
FIG. 4A
FIG. 4B
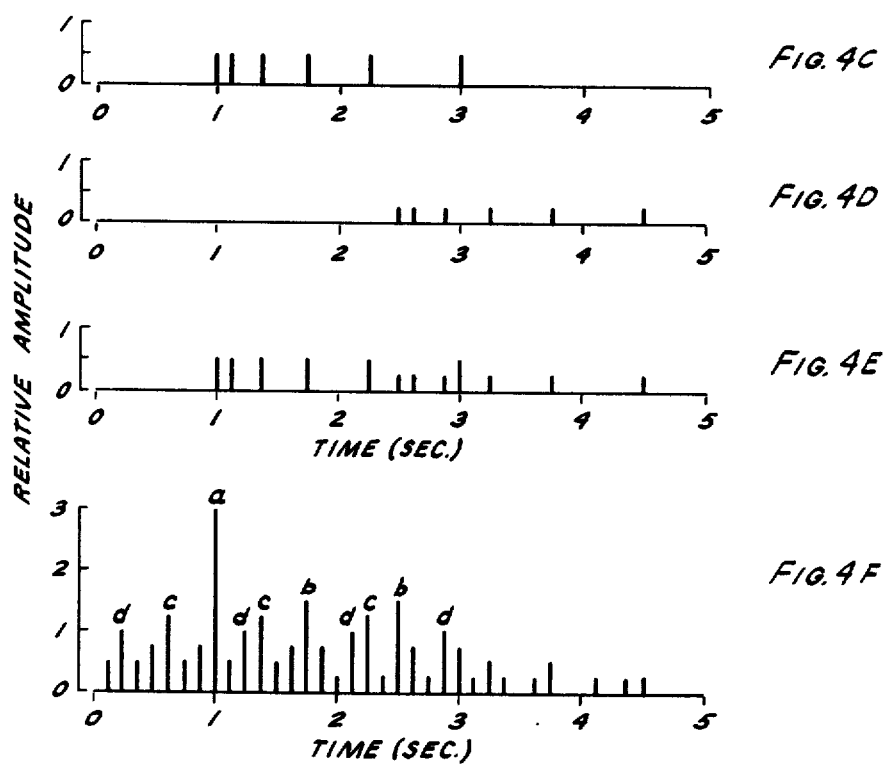
FIG. 4C
FIG. 4D
FIG. 4E
FIG. 4F

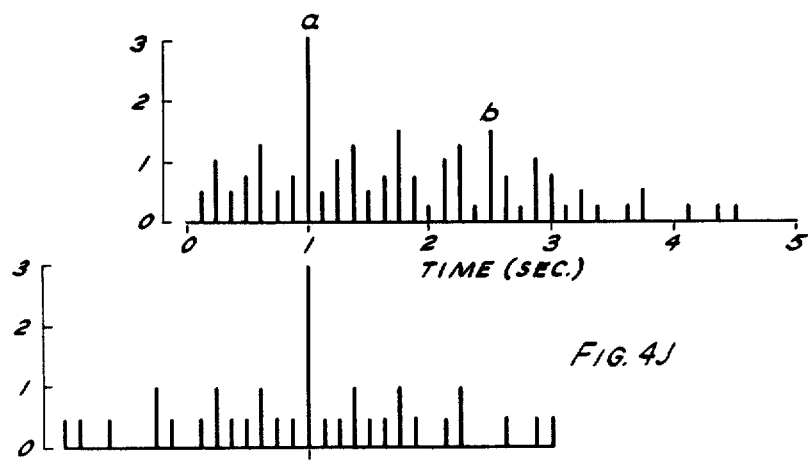
FIG. 4I
FIG. 4J
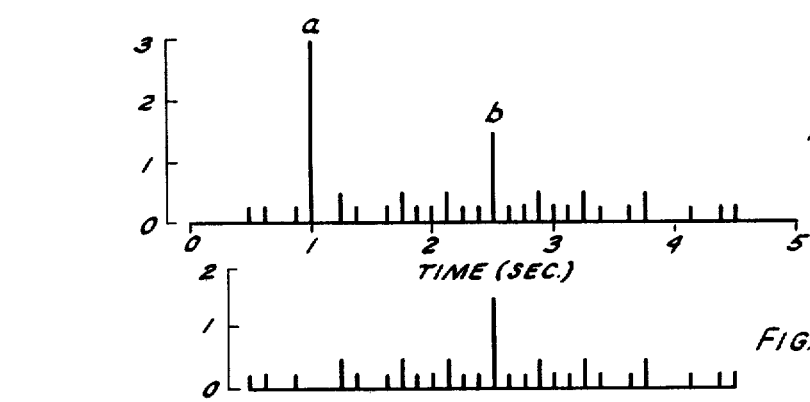
FIG. 4K
FIG. 4L
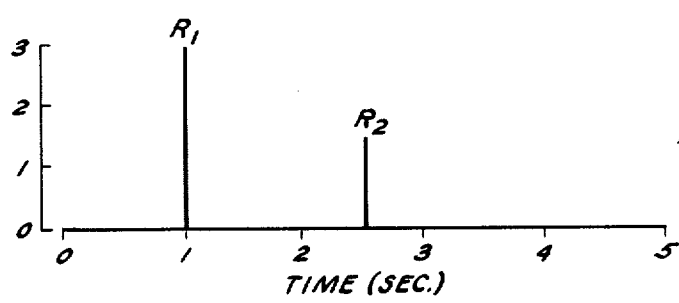
FIG. 4M

SECONDS

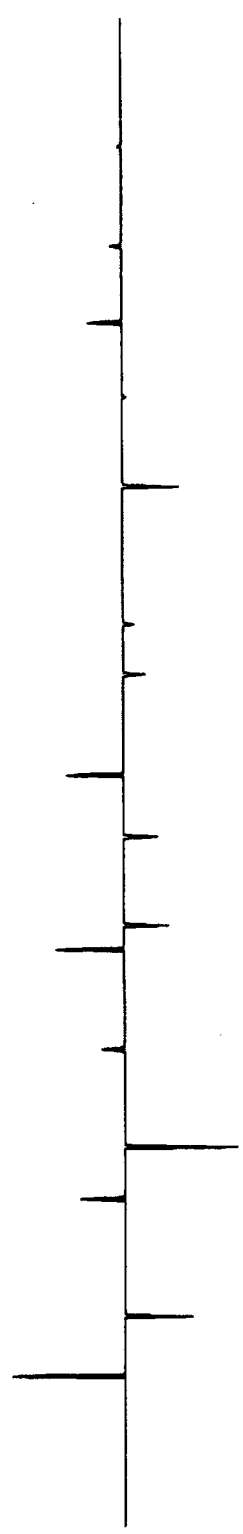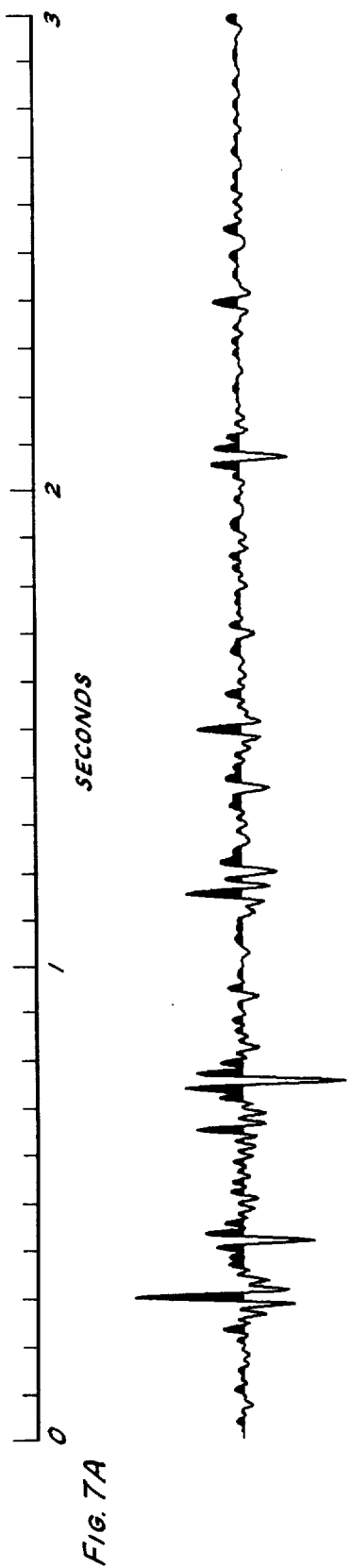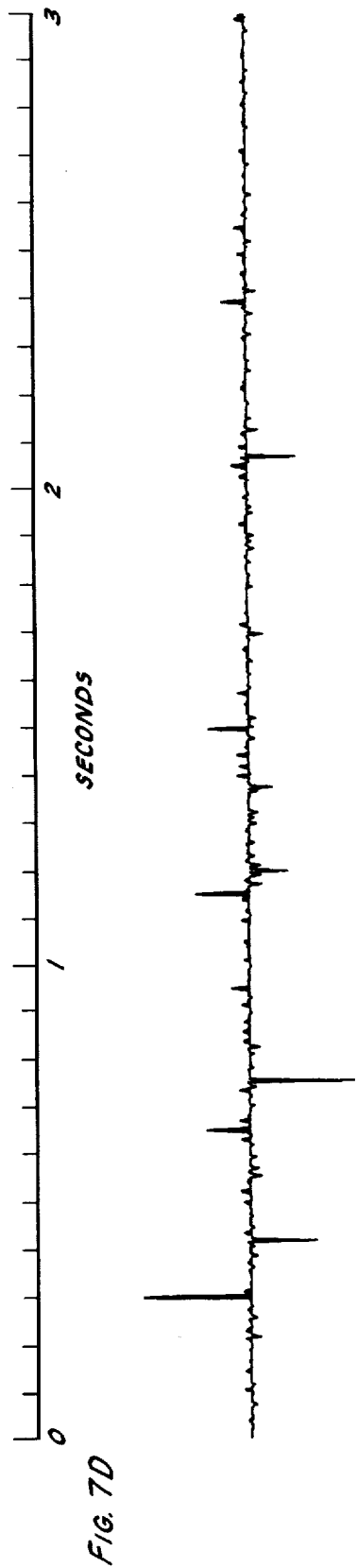
FIG. 7A
FIG. 7D
FIG. 7F

SEISMIC EXPLORATION METHOD

RELATED APPLICATION

This is a continuation-in-part of application Ser. No. 743,929, filed Nov. 22, 1976, now abandoned.

BACKGROUND OF THE INVENTION

1. Field of the Invention

This invention relates to methods for seismic exploration, particularly to methods for seismic exploration using multiple impulse or long emission seismic signals, and most particularly to methods for improving the quality of the seismic traces obtained in seismic exploration methods.

2. Description of the Prior Art

Seismic exploration techniques, in which energy in the form of seismic waves is transmitted into the earth and in which the reflected waves are detected, converted to digital signals, and recorded, are well known in the art. In very early methods, a relatively large explosive charge was detonated at, or just below, the surface of the earth. Due to the large amount of energy transmitted into the ground, the reflected energy waves were of sufficient amplitude as to be easily distinguishable from the random background noise which also appeared in the recorded seismic trace. More recently, methods have been developed in which a plurality of relatively small energy emissions or waves are transmitted into the earth. In these methods, the recorded traces from numerous emissions are "crosscorrelated" and "stacked" to produce a finished trace of satisfactory quality. The success of these methods is attributable to the fact that background noise is relatively random and, therefore, as the numerous traces are stacked, the recorded waves attributable to this noise are out of phase and will therefore on adding be effectively cancelled. The waves due to actual seismic events, on the other hand, will add in phase and be reinforced, thereby building a high ratio of reflective signal-to-noise amplitude.

There are basically three techniques of seismic exploration with low energy multiple emission sources. These techniques are distinguished by their respective seismic source devices and the timing of the source emissions as follows:

(1) "Single shot-listen" techniques, such as those disclosed in U.S. Pat. No. 3,956,730 to Barbier, in which a single impulse from a small explosive charge or a weight-dropping apparatus is transmitted into the earth and the waves reflected from within the earth are recorded during a "listening period", which is at least as long as the two-way travel time to the deepest reflector of interest, before the next source impulse is transmitted;

(2) "Long source-listen" techniques, such as the well known VIBROSEIS ® system, in which a single relatively long, amplitude and/or frequency varying signal is transmitted into the earth and the waves reflected from within the earth are recorded during a "listening period", which is at least as long as the source emission time plus the two-way travel time after the end of the long signal, before the next long signal is transmitted;

(3) "Impulse train" techniques, such as disclosed in U.S. Pat. Nos. 3,622,970 to Sayous et al. and 3,698,009 to Barbier, in which a plurality of nearly identical impulses are transmitted into the earth, usually according to a precise code. In the code, the individual impulses are separated by varying time intervals of less than the two-way travel time but the duration of the impulse train is longer than the two-way travel time. The waves reflected from within the earth are recorded for a period of time usually at least equal to the duration of the impulse train plus the two-way travel time before the next impulse train is transmitted.

The subsequent processing of the individual traces from each of these techniques is similar and is well known in the art. If a series of raw traces are obtained by repeated emission of a single source code, the traces are conventionally processed as follows:

a. vertical stack—individual traces with nearly identical source and geophone locations are "stacked" (added) together usually without correction for moveout;

b. crosscorrelation—the vertically stacked traces are correlated with a record of the source code;

c. moveout correction—the reflected events of the trace are time shifted to correct for each of the three types of moveout (normal, dip, and static); and d. common depth point (CDP) stack—traces from sets of sources and geophones which have a common midpoint between the respective source and geophone are stacked.

Optionally, various conventional filtering and/or muting methods may be applied to the traces. Subsequently, the reflection travel times from these traces are converted to depths and are then compiled to form depth maps and cross sections of the earth strata explored.

If, however, the series of raw traces had been obtained by emission of several different coded energy signals, the order of steps a and b above would be reversed, i.e., each trace would be crosscorrelated with a signature of the corresponding coded energy signal before vertical stacking.

The primary purpose of these processing techniques is to increase the reflective signal-to-background noise amplitude ratio. However, in the crosscorrelation step, a different type of noise, in which the peaks are commonly known as correlation residuals or side lobes, is introduced into the seismic trace. Since these residuals broaden the time duration of the seismic events thereby decreasing seismic resolution, and since they are of no seismic interest and indeed have no physical significance, they are as undesirable as the naturally occurring background noises.

Various methods have been devised to reduce the size of the correlation residuals and thereby increase the ratio of reflective event signal-to-noise (background plus residual) amplitude. U.S. Pat. No. 3,326,320 to Forester discloses a seismic survey method in which two specially coded source signals are separately transmitted into the earth from the same sourcepoint and sensor locations and the reflected seismic trace from the emission of the second code is subtracted from the trace of the first code emission. U.S. Pat. No. 3,622,970 to Sayous et al. discloses a seismic exploration method in which a specially coded impulse train of constant amplitude and polarity impulses is transmitted into the earth and the resulting seismic trace is crosscorrelated by the shift-summing method. While these and other prior art methods can reduce the relative amplitude of the correlation residuals, they require precisely controlled, and usually expensive, seismic sources. Furthermore, even though the residuals of these methods are ideally only 1/10 to 1/20 of the amplitude of the reflective event, the residuals can still obscure the reflected energy from relatively weak seismic events. This interference is especially detrimental in very deep surveying because the energy reflected from even major, deep reflectors is relatively weak.

Accordingly, a primary object of this invention is to provide an improved seismic exploration method.

Another object of this invention is to provide an improved seismic exploration method which does not require precisely controlled seismic sources.

Still another object of this invention is to provide an improved seismic exploration method resulting in the production of high quality seismic data.

Yet another object of this invention is to provide an improved method for delineating subterranean mineral deposits using reflective seismic exploration.

A further object of this invention is to provide a seismic exploration method which produces highly resolved seismic traces and which thereby allows more accurate delineation of subterranean mineral deposits for the subsequent placement of wells to develop the mineral deposits.

A still further object of this invention is to improve the quality of seismic traces obtained from the various seismic exploration techniques by removing from the data the correlation residuals which are introduced during the correlation step of conventional data processing.

An additional object of this invention is to provide a method in which high quality seismic data is produced using coded energy signals which can be generated by less sophisticated seismic sources than the precisely controlled seismic sources of the prior art.

Yet another object of this invention is to improve the ratio of seismic event signal-to-noise amplitude by predictively removing the correlation residuals from the crosscorrelated seismic trace and thereby eliminate the requirement for the high quality coded energy signals which can only be generated by precisely repeatable and controllable seismic sources.

Other objects and advantages of this invention will become apparent to those skilled in the art from the following description.

SUMMARY OF THE INVENTION

Briefly, this invention provides a seismic exploration method in which a frequency variable coded energy signal having a quality factor of at least about 1.2 is generated and transmitted into the earth; a raw seismic trace is recorded and crosscorrelated with a signature of the coded energy signal to produce a crosscorrelated trace; and the undesirable correlation residuals are predictively removed from the crosscorrelated trace by subtractive application of a predictive subtraction deconvolution (PSD) operator. The high quality processed trace thus obtained is interpreted using geophysical principles to delineate subterranean mineral deposits of interest. Based on this interpretation at least one well is drilled to further explore and/or develop the mineral deposits of interest.

The PSD operator used to remove correlation residuals from the crosscorrelated traces is derived from the autocorrelation function of the source signature. The operator contains the predicted size and position of the correlation residuals relative to the operator central, single-largest absolute maximum. This operator central absolute maximum is scaled to the largest absolute amplitude sample of the correlated trace. The central absolute maximum of the scaled operator is then aligned with the particular sample and the scaled predictive residuals of the operator are subtracted from the trace at the predicted positions relative to the particular sample. This procedure is repeated with the next largest absolute amplitude sample, and so on, until either all the samples above a predetermined amplitude have been processed or an arbitrary maximum number of iterations have been performed.

Because the method of this invention effectively removes correlation residuals from the seismic traces, lower quality coded energy signals may be used successfully, thereby allowing the use of simpler, less expensive seismic sources than are suitable for use in the conventional seismic exploration methods.

BRIEF DESCRIPTION OF THE DRAWINGS

The invention will be more readily understood by reference to the accompanying drawings, of which:

FIGS. 4A through 4M are graphical representations illustrating an application of the method of this invention to noise-free, ideal earth strata;

FIGS. 7A through 7F are graphical representations illustrating the seismic data obtained by application of still another embodiment of the method of this invention to complex earth strata containing added random noise.

DETAILED DESCRIPTION OF THE INVENTION

Figure 1:
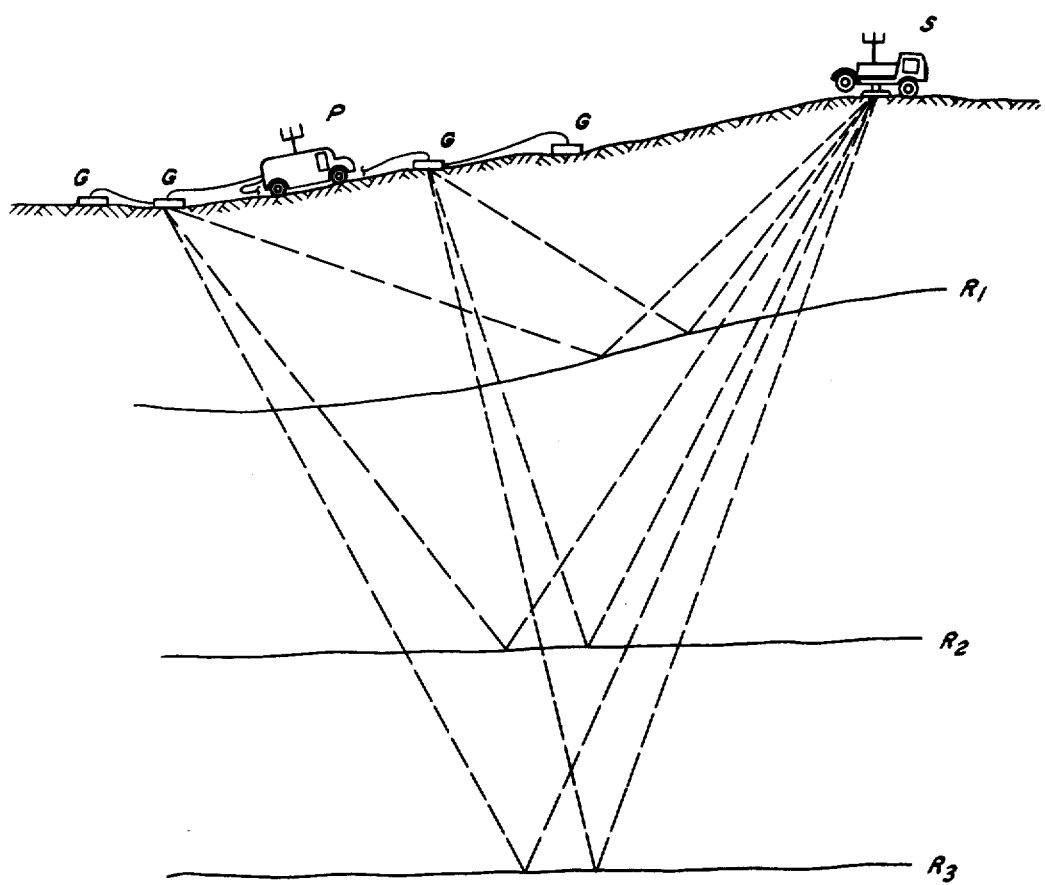
FIG. 1 is a schematic diagram of a cross section of earth strata illustrating one embodiment of the seismic exploration method of this invention.

As illustrated in FIG. 1, a source S located on or near the earth surface transmits energy into the earth strata. Some of this energy is reflected from the subsurface reflectors $R_1$, $R_2$ and $R_3$. The reflected energy is sensed by the energy sensor G and periodic samples of the reflected energy sensed by each of the sensors are taken, digitized and recorded in a recording means P. During the period of source emission, a record of the seismic source emission code, herein called the source signature, is normally transmitted to, and recorded by, the recording means.

The energy sensors G sense not only reflected energy but also refracted, defracted, "direct arrival" and "air wave" energies. Direct arrival is that energy which travels from the source to the sensors along the shortest route, usually the surface. Air waves are the shock waves transmitted to the sensors through the air. The sensors will also sense energies which are not due to the source emissions, such as background noise. The term "reflected energy" as used herein should be understood to mean any energy sensed by the energy sensors which is directly or indirectly attributable to the source emissions.

The data processing steps of the method of this invention are useful not only in seismic exploration, such as reflective and refractive exploration, but are also successfully employed in other exploration methods such as those in which electrical or electromagnetic energy is transmitted into the earth. The method is also useful in well logging. In fact, any exploration method in which a recorded energy trace, which is proportional to the energy sensed from within the earth, is crosscorrelated with the source signature of the transmitted coded energy signal will benefit from the novel correlation residual removal step of the method of this invention. Such coded energy signals include but are not limited to acoustic, sonic, elastic, mechanical, electrical and electromagnetic energy signals. Furthermore, the exploration methods may use a combination of these types of energy, such as disclosed in U.S. Pat. Nos. 3,975,674 to McEuen and 3,621,380 to Barlow, Jr.

Any of the conventional, low energy, multiple impulse or long signal sources are suitable for use in the method of this invention. For seismic surveying of land formations suitable sources include: vibrating sources which emit a long, amplitude and/or frequency varying signature, such as a VIBROSEIS ® type source; weight-dropping sources in which a single weight is repeatedly raised and dropped, or in which several weights are dropped to give a series of impulses; explosive-type sources in which a plurality of explosive charges are detonated in a time-varying pattern; impacting sources in which a reciprocatable piston is repeatedly forced against the surface; and other sources such as the seismic source utilizing counter-rotating weights disclosed in U.S. Pat. No. 3,244,252.

The method of this invention is equally successfully applied in offshore seismic exploration where seismic sources emit energy at or near the water surface. Suitable conventional sources for the offshore or marine seismic exploration include: electrical spark sources which transmit energy into the earth by emitting a series of electrical sparks; explosive devices which emit a series of explosive energies; and imploding seismic sources in which a series of glass spheres are allowed to implode.

In fact, any seismic source is suitable for use in the method of this invention if it is capable of generating a coded energy signal which is characterized by an autocorrelation function having a central, single-largest absolute maximum which is at least about 1.2 times the absolute amplitude of the next largest absolute maximum of the function. The sources which are preferred for use in the method of this invention are those which transmit a coded energy signal for which this ratio of the central, single-largest and the next largest absolute maxima is at least about 1.5, more preferably about 2.0, and most preferably at least 3.0. If the source can only generate coded energy signals which have a ratio of the central, single-largest absolute maximum to the next largest absolute maximum of the autocorrelation function of the source code signature of about 1.0, that source can not be used successfully in the method of this invention.

The ratio of the central, single-largest absolute maximum to the next largest absolute maximum of the autocorrelation function is a reliable measure of the quality of the coded energy signal and is herein referred to as the "quality factor". Coded energy signals having high quality factors yield seismic traces with superior resolution. Most seismic sources can be controlled, within limits, to adjust the quality of the coded energy signals generated thereby, usually by controlling the frequency variance of the signal in a manner well known to those skilled in the art. However, the generation of very high quality coded energy signals usually requires very precise control of the seismic source. This control is generally only achieved by adding bulky and expensive source control equipment. Devices which are not capable of generating coded energy signals having quality factors of at least 20, usually at least 50, are considered to be unsuitable for use as a seismic source in high resolution seismic exploration.

The method of this invention is not so limited. The coded energy signals employed in the method of this invention need only have a quality factor of about 1.2 or higher because the correlation residual removal step of the method of this invention effectively increases the resolution of the seismic traces produced thereby. Of course, the method of this invention is entirely operable using coded energy signals having very high quality factors, such as 100 or higher. However, the superior resolution obtainable using the method of this invention is especially evident when using coded energy signals having quality factors between about 1.5 and about 20, such coded energy signals being in fact preferred for use in the method of this invention due to the reduced cost and bulkiness of the seismic source required to generate these signals. Coded energy signals having quality factors between about 2 and about 10 are used successfully in the method of this invention, and good results are obtained using coded energy signals having quality factors of about 3.

The energy sensors and recording means useful in the method of this invention are well-known in the art. The energy sensors, such as geophones, normally emit a time-varying current or voltage signal proportional to the energy it senses. The signal from each sensor is sampled periodically, the polarity and magnitude of the sample are digitized, and the digitized signal is stored or recorded in a memory series or channel, typically in a computer memory or on magnetic tape. Conventionally, the samples of 12 or more sensors or channels are recorded by a single recording means. The sampling rate varies considerably but is usually between 0.1 to 10 samples per millisecond and is most often 0.2 to 1 samples per millisecond. The energies received from a single seismic source emission are sampled normally during a "listening" period from the time of the first emission of the source until a time equal to the two-way travel time to the deepest reflector of interest, after the last emission of the source. The coded energy signal transmitted may typically range from 2 to 200 seconds in length and the two-way travel time may vary from 1 second, for very shallow prospecting, to 10 seconds, for very deep prospecting. The listening period for a single trace may thus vary from about 3 seconds to over 200 seconds, although listening times of 5 to about 50 seconds are more common. The data for each channel thus recorded is herein referred to as the raw, uncorrelated seismic trace for that sensor or channel.

In a similar manner, the signature of the coded energy signal generated by the seismic source is recorded by the recording means. The source emissions may be continuously monitored and a facsimile signal transmitted to the recording means by means of a radio transmitter or electrical conduit, or the source could be commanded to emit energy according to a predetermined code stored in the memory of the recording means as is disclosed for example in U.S. Pat. 3,689,009 to Barbier. In any case, some record of the source code is required in order to form the predictive subtraction deconvolution (PSD) operator which is utilized in the subsequent steps of the method of this invention. This record is herein referred to as the source signature.

The raw, uncorrelated seismic traces and source signatures are then processed in accordance with the method of this invention by a combination of the novel predictive subtraction deconvolution step of this invention and various conventional steps of crosscorrelation, autocorrelation, vertical and CDP stacking, moveout corrections, muting, frequency filtering and various other geophysical interpretive techniques.

These latter steps are well-known in the art and a detailed description of them is not therefore necessary; however, a short definition and description of some of them as paraphrased from the definitions found in R. E. Sheriff's *Encyclopedic Dictionary of Exploration Geophysics*, Society of Exploration Geophysicists, Tulsa, Oklahoma (1973) is as follows:

Crosscorrelation is a method of combining two waveforms, in this case the seismic trace waveform g(t) with the source signature waveform f(t), to measure the similarities of the waveforms. The crosscorrelation function $\Phi_{gf}(\tau)$ is defined as follows:

$$\Phi_{gf}(\tau) = \lim_{T \to \infty} \frac{\int_{-\frac{1}{2}T}^{\frac{1}{2}T} g(t) \cdot f(t+\tau) \, dt}{\left[\int_{-\frac{1}{2}T}^{\frac{1}{2}T} g^2(t) dt \cdot \int_{-\frac{1}{2}T}^{\frac{1}{2}T} f^2(t) dt\right]^{\frac{1}{2}}}$$

For the purpose of this application, the term crosscorrelation will also be defined to include the relatively new, though conventional, correlation method called shift-summing which is normally used with coded, constant amplitude, multiple impulse seismic sources. This method is disclosed in U.S. Pat. No. 3,698,009 to Barbier.

Autocorrelation is a method of combining a waveform f(t) with itself. The autocorrelation function $\Phi_{ff}(\tau)$ is defined as follows:

$$\Phi_{ff}(\tau) = \lim_{T \to \infty} \frac{\int_{-\frac{1}{2}T}^{\frac{1}{2}T} f(t) \cdot f(t+\tau) \, dt}{\int_{-\frac{1}{2}T}^{\frac{1}{2}T} f^2(t) \, dt}$$

Similarly, autocorrelation as herein defined includes the shift-summing of the waveform, according to its own code.

Vertical stacking is defined as the summing together of the records of several emissions made with nearly the same source point and sensor locations without correcting for moveout differences.

Common-depth-point (CDP) stacking, also called horizontal stacking, is the summing of traces which correspond to the same subsurface reflection point but which are from different profiles and have different source point to sensor offset distances. These traces are corrected for moveout before CDP stacking.

Moveout corrections, also referred to as stepout corrections, are made to correct for the difference in arrival time at the sensors, which is due to any one of the three types of moveout:

(a) normal moveout is the difference in travel time due to varying source point to sensor distances or offsets;

(b) dip moveout is the difference in travel time due to the angle, or dip, of the subsurface reflectors; and (c) static moveout is the difference in travel time due to elevation and weathering differences along the travel path.

Muting is the method by which the relative contribution of the traces to be stacked is varied. In the early part of the record the long offset traces may be muted or excluded from the stack in order to keep ground roll, air waves and noise bursts out of the stack.

Various known frequency filtering methods are also applied to discriminate against or remove some of the amplitude of the sampled values. The filters of these methods may screen the samples as they are being recorded and/or after they have been recorded. The various types of filters are listed by Sheriff, ibid., and other references of the art.

In the novel predictive subtraction deconvolution (PDS) step of this method, a PSD operator, which accurately predicts the relative size and position of the correlation residuals for every true seismic event on the crosscorrelated trace, is subtractively applied to the trace. The PSD operator is essentially the autocorrelation function of the source signature. For a source signature, f(t), the PSD operator, P(τ), is:

$$P(\tau) = \lim_{T \to \infty} \int_{-\frac{1}{2}T}^{\frac{1}{2}T} f(t) \cdot f(t+\tau) \, dt$$

For a source signature in digital form, $g_k$, the PSD operator, $P_l$ is:

$$P_l = \lim_{N \to \infty} \sum_{k=-N}^{N} g_k \cdot g_{(k+l)}$$

The PSD operator is normally a symmetrical function with a single-largest absolute maximum at its center. The other non-zero amplitude values of the function are herein referred to as the operator residuals. For an operator which may have a relatively broad center maximum, the values which are non-zero are displaced at least a small increment of time away from the exact center of the operator are also considered residuals. This type of residual may occur in source emission codes such as the VIBROSEIS ® type coded energy signals.

The PSD operators of the method of this invention are normally symmetrical, i.e., the predictive residuals on either side of the central, single-largest maximum are a mirror image of the predictive residuals on the other, however, with some combinations of source signatures and crosscorrelation methods an unsymmetrical operator may be obtained and properly used. For example, a source signature comprising a plurality of constant polarity but varying amplitude impulses would yield an unsymmetrical PSD operator if it were autocorrelated by the shift-summing method. This would be the proper operator to be used to remove correlation residuals from the shift-summed seismic trace obtained from the emission of that type of a coded energy signal. In every case the PSD operator should be obtained by autocorrelation of the source signature by the same correlation method as is used to crosscorrelate the raw seismic trace with the source signature.

Once the PSD operator has been derived, the crosscorrelated trace is treated iteratively as follows:

1. The crosscorrelated seismic trace comprising a plurality of samples is scanned to locate the largest absolute amplitude sample which has not been previously PSD treated. In the first iteration none of the sample have as yet been treated.
2. The PSD operator is scaled to the particular sample being treated in this iteration. If the particular sample has an amplitude of X, and the central maximum of the PSD operator, P(t), has an amplitude of Z, the scaled operator, S(t), is:

$$S(t) = \left(\frac{X}{Z}\right) \cdot P(t)$$

If the particular sample has a negative polarity, e.g., X = −5, the scaled operator will have a polarity opposite that of the PSD operator, P(t). The scaled operator contains the exact size and relative location of the correlation residuals for that particular sample.

3. The scaled operator is time shifted so that the central maximum of the scaled operator is aligned with the particular sample and then the scaled operator residuals are subtracted from the crosscorrelated trace.
4. The PSD treated trace can either be treated again, by repeating steps 1 through 3, or, after a desired number of PSD iterations have been made, the trace will be further processed according to the method of this invention.

A single seismic event in the trace normally is made up of more than one sample. Correlation residuals are produced on the trace for each and every non-zero sample of every true seismic event, therefore repeated application of the PSD operator to a crosscorrelated trace, produced by the transmission of a coded energy signal into ideal earth strata with a limited number of reflectors, would yield a clean seismic "picture" of the strata with no correlation noise after one PSD iteration has been made for each non-zero sample of each of the seismic events. As a practical matter, earth strata are not ideal, there are hundreds of reflectors per second of seismic travel time, and the background noise present, even on crosscorrelated traces, obscures the smaller amplitude events due to weak reflectors. Therefore, as a practical matter, only an arbitrary maximum number of PSD iterations are normally made for each crosscorrelated trace.

In the method of this invention, samples of the signal from each of the energy sensors are taken about every 0.1 to 10 milliseconds. The number of PSD iterations will normally be in the range of from about 0.001 to about 1.0 iterations per sample. The preferred range is from about 0.02 to about 0.6 iterations per sample and more preferably the range is from about 0.1 to about 0.5 iterations per sample. Expressed in samples per iteration, there ranges are from about 1 to about 1000, from about 1.5 to about 50 and from about 2 to about 10 samples per iteration, respectively. Expressed another way, the number of iterations per second of crosscorrelated trace length is normally in the range of from about 1 to about 3000 iterations per second, more preferably from about 10 to about 500 iterations per second, and most preferably from about 40 to about 100 iterations per second of crosscorrelated trace length.

Alternatively, the trace may be iteratively treated until the absolute amplitude of the next largest sample not previously treated is less than some arbitrarily chosen minimum amplitude. Or the iterations may be stopped when a plurality of samples not previously treated, for example more than 10 samples, have exactly the same absolute amplitude.

Numerous other methods for ending the iterations will be obvious to those skilled in the art. It should be noted that if every sample of a trace is treated the iterations would cease.

Figure 2:
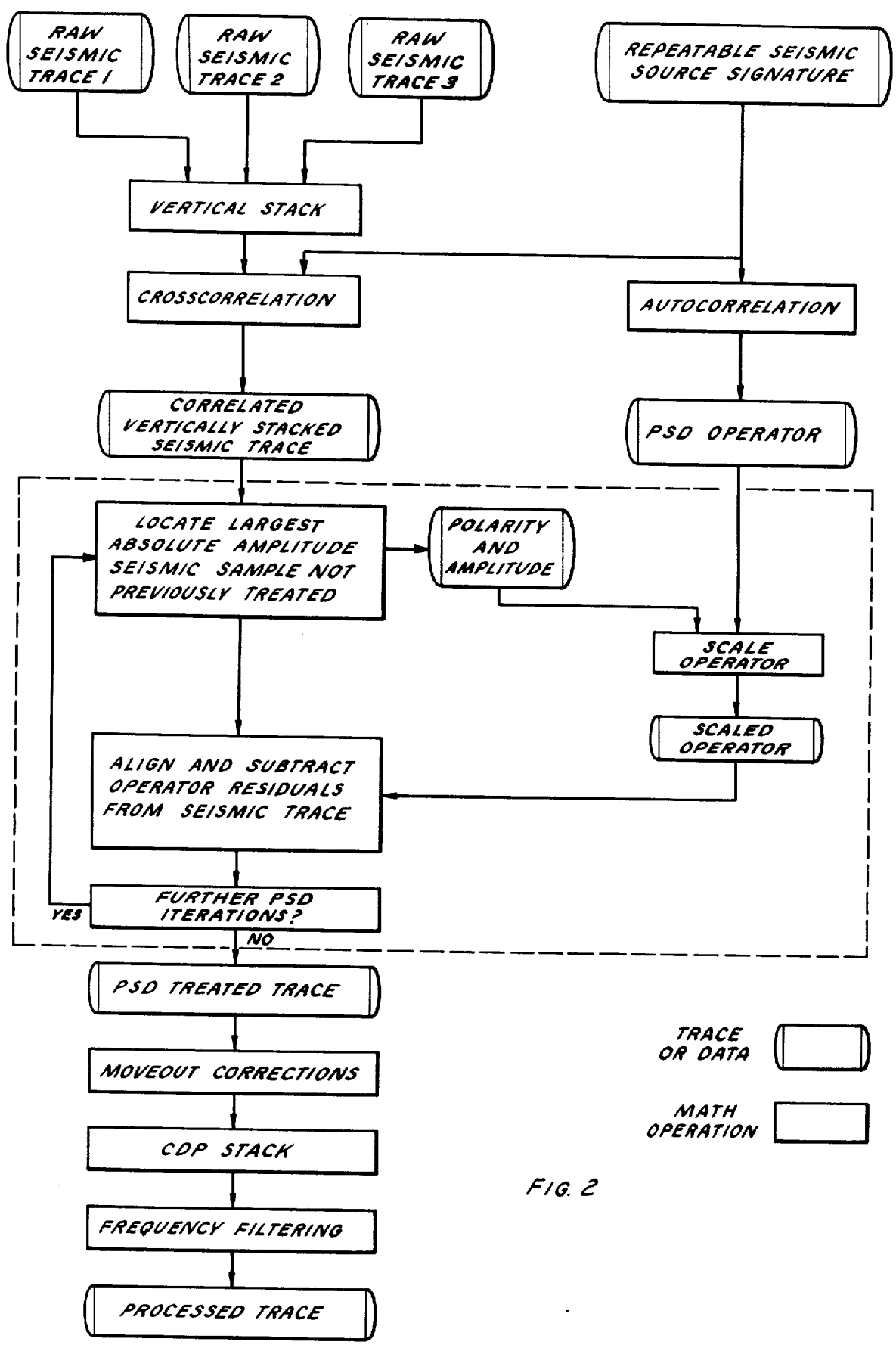
FIG. 2 is a block diagram illustrating the preferred data processing steps of the method of this invention for recorded data resulting from multiple emissions of a single source code.
Figure 3:
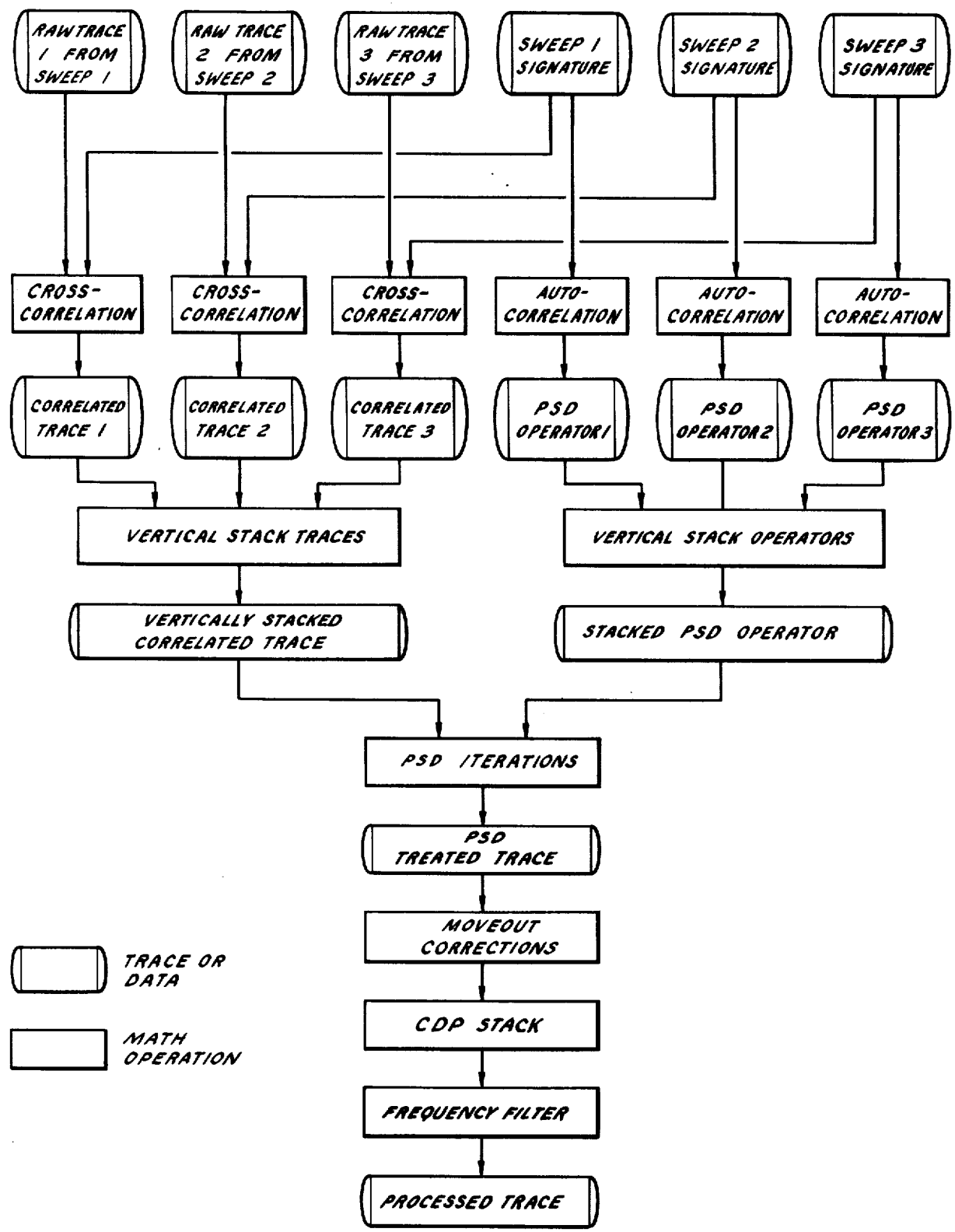
FIG. 3 is a block diagram illustrating another embodiment of a data processing step of the method of this invention for recorded data resulting from emissions of three different coded energy signals.

The PSD iterations must be made after the raw seismic trace has been crosscorrelated, and is most preferably done in the order shown in either FIG. 2 or FIG. 3.

In one embodiment of the method of this invention, as illustrated in FIG. 1, a seismic source S repeatedly transmits a frequency variable coded energy signal into the earth according to a single time-varying source emission code. The energy returning from the subsurface reflectors $R_1$, $R_2$ and $R_3$ is sensed by the energy sensing means G. The energy sensing means G each emit a first signal which is proportional to the energy it senses. This first signal is sampled and recorded by the recording means P in a separate memory series or channel for each sensory means. A second signal proportional to the source emission code is emitted by the seismic source S and similarly is sampled and recorded by the recording means P. The recorded contents of the memory series or channel for each sensing means is herein called the raw or uncorrelated trace. The record of the source emission code is called the source code or source signature.

The raw trace and source signature are then processed as shown in FIG. 2. This processing may be done manually or mechanically, either on location or off site. As a practical matter, the processing will be done in a digital computer. As shown, the three raw traces, which were recorded at a single sensor location after consecutive transmissions from the same sourcepoint of three identical coded energy signals, are vertically stacked to give a single vertically stacked trace. This vertically stacked trace is crosscorrelated with the source signature to give a crosscorrelated, vertically-stacked trace, and the source signature is autocorrelated to give the PSD operator.

The correlated, stacked trace is treated by repeated subtractive application of scaled PSD operators until all significant correlation residuals have been removed. The steps of the PSD iterations are enclosed by a dashed box in FIG. 2. The PSD treated trace is then corrected for normal, dip, and static moveout; common depth point are CDP stacked and frequency filtered to yield the processed trace. The processed traces obtained in this method contains no significant correlation residuals and are superior in quality to traces processed by the same method excluding the PSD iterations.

The high quality processed traces are then interpreted using geophysical principles to convert the time traces into depth maps and cross sections indicating the probable configuration of the subterranean strata. The term "geophysical principles" is used herein to define the well-known techniques and concepts used in the conversion of individually processed time traces into the depth maps and cross sections. The exact interpretation scheme employed is not deemed critical but rather is a matter of choice. Generally, the interpretation will include velocity analysis, common depth point compilations, filtering and conversion of the time traces to depth maps and cross sections. These principles are well known to those skilled in the art and are fully described in geophysical reference books, such as Dorbin, M.B., *Introduction to Geophysical Prospecting*, 3rd Edition, McGraw-Hill, Inc., 1976, which is herein incorporated by reference.

The depth maps and cross sections generally show various features which are indicative of the mineral deposits of interest. For example, a stratigraphic trap or salt dome indicated on the depth map would be a likely candidate for an accumulation of petroleum and/or natural gas. Other mineral deposits, such as salt deposits, uranium-bearing ores, coal seams, etc., can be tentatively identified from the depth maps.

The maps and cross-sections are then used to select a suitable well site for further exploration or development of the mineral deposits. The maps and cross-sections can also be used to identify potentially troublesome formations in the path of the well, such as a high pressure formation. Proper drilling conditions can then be selected for penetrating the potentially troublesome formations. The well site is generally selected such that drilling costs are kept to a minimum and the potentially troublesome formations can be controlled during drilling to minimize the risk involved.

A well is then drilled to confirm the existence of the mineral deposit of interest. In some cases, the well will be simply a relatively small diameter core hole or logging hole drilled to obtain more information on the mineral deposit. More commonly a relatively large diameter borehole is drilled which can later be converted to a development well upon confirmation of a mineral deposit of commercial significance.

In another preferred embodiment of the method of this invention wherein the seismic source does not or cannot repetitively transmit energy according to a single precise code, the seismic source S of FIG. 1 separately transmits a series of differently coded energy signals into the earth and the trace of the energy sensed by each sensor G from each coded energy signal is recorded separately and a record of each of the source signatures is made. The raw seismic traces and source signatures are subsequently processed as shown in FIG. 3.

Each raw trace is crosscorrelated with its respective source signature, the individual correlated traces from common source point and sensor locations are then vertically stacked to give one vertically stacked, correlated trace. In a similar fashion, each source signature is individually autocorrelated to form the individual PSD operators. These operators are then vertically stacked to give a single "stacked" PSD operator. The vertically stacked, correlated trace and "stacked" PSD operator are then treated in the same manner as were the correlated, vertically stacked trace and single PSD operator of FIG. 2.

Each of the raw traces of FIG. 3 could have been crosscorrelated, PSD treated and then vertically stacked, but this would have required a great many more PSD iterations. The quality of a 3-second, processed trace obtained by the method of FIG. 3 using 200 iterations with a "stacked" PSD operator is at least as good as the processed trace obtained by crosscorrelating each trace, making 200 iterations with each individual PSD operator, and then vertically stacking the individual PSD treated traces, applying moveout corrections, etc. Of course, the processed trace obtained by either of these methods is superior in quality of a trace produced by the same method but excluding the PSD iterations.

In the correlation residual removal steps of the method of this invention, the scaled PSD operator is "aligned" with the correlated trace. By "aligning" the operator with the correlated trace, it is not intended to limit the scope of this invention to physical alignment. Rather it is intended to include the type of time-alignment which can be done in a digital computer. It is only necessary that the operator samples, which predict the relative size and location of the correlation residuals, are subtracted from the proper samples on the correlated trace. Therefore, as used herein, the term "aligning" should be broadly construed to include its practical equivalents.

It is contemplated that a modified PSD operator can be beneficially employed to remove correlation residuals from a correlated seismic trace. Some source signatures are as long as 200 seconds; the autocorrelation function of such a source signature would be 400 seconds long. If the two-way travel time to the deepest reflector of interest is from about 1 to about 10 seconds, the only part of the crosscorrelated trace which is of interest is the first 1 to 10 seconds. Application of a 400-second operator to a 10 second crosscorrelated trace would require expensive and unnecessary computer time and memory space.

The modified PSD operator, $M(\tau)$, for a source signature $f(t)$, which will be applied to a correlated seismic trace of length, Q, i.e., the deepest reflector of interest is at a depth equal to the two-way travel time Q, would be as follows:

$$M(\tau) = \int_{-Q}^{Q} f(t) \cdot f(t + \tau)\, dt$$

And, similarly, for a digital source signature $g_k$, the modified PSD operator, $M_t$, would be:

$$M_t = \sum_{k=-Q}^{Q} g_k \cdot g_{(k+t)}$$

Other modifications to shorten the operator length still further must be made with care. A mere lopping off of the ends of the operator could cause an undesirable discontinuity in the treated trace. For example, if an operator which has residuals of relatively substantial amplitude at positions $+Q$ and $-Q$ from the central maximum and the operator is lopped off at K, where $K < Q$, these substantial residuals will be left on the trace after PSD treatment and would mistakenly be interpreted as seismic events. Further modifications should be made by methods such as cosine tapering. A cosine tapered PSD operator, C(t), of length 2T, is obtained from the PSD operator, P(t), as follows:

$$C(t) = P(t) \cdot [\tfrac{1}{2}(1 + \cos(\pi\, t/T))] \text{ for } -T \leq t \leq T$$
$$C(t) = 0 \qquad\qquad \text{ for } t > T \text{ or } t < -T$$

where T = one-half the length in seconds of the cosine tapered operator C(t).

In another preferred embodiment of the method of this invention, the seismic source is a multiple impulse source which emits a plurality of constant polarity and amplitude impulses and the recording means includes a shift-summing device for automatically shift-summing the digitized seismic samples as they are received. With the same sourcepoint and sensor location, several constant polarity and amplitude multiple impulse trains, i.e., coded energy signals, are transmitted into the earth and the shift-summed trace from each successive train is automatically added to the previously recorded shift-summed trace. Similarly, the shift-summed source signature from each successive train is automatically added to the previously recorded shift-summed signatures. This recording means has therefore automatically correlated and vertically stacked both the seismic traces and the source signatures. A recording means which automatically shift-sums the digitized seismic samples as they are recorded is disclosed in U.S. Pat. No. 3,698,009 to Barbier. The preferred recording means for this embodiment of the method of this invention would also automatically shift-sum the source code samples as these samples are recorded in a separate memory series. The shift-summed source signature thus obtained is a partial predictive operator comprising a single-largest absolute maximum and an unsymmetrical plurality of predictive residuals. The stacked PSD operator is obtained from the partial predictive operator by adding a second unsymmetrical plurality of predictive residuals, which are a mirror image of the predictive residuals of the partial operator, to the operator thereby forming a symmetrical operator with a central, single-largest absolute maximum. The stacked PSD operator (the stacked, shift-summed source signatures) is then subtractively applied to the vertically-stacked, shift-summed trace.

The seismic exploration method of this invention is further illustrated by the following examples which are illustrative of specific modes of practicing the invention and are not intended as limiting the scope of the invention as defined by the appended claims.

EXAMPLE 1

As shown in FIG. 4A, a seismic source, an energy sensing means, and a data recording means are situated on a horizontal surface of the earth. Below this surface are two perfectly parallel, horizontal reflectors, $R_1$ at a depth equivalent to 0.5 seconds of seismic wave travel time and $R_2$ at a depth equivalent to 1.25 seconds. For the purposes of this idealized example, it is assumed that the formations between the surface and reflectors transmit energy perfectly, that there are no background noises or other interferences, and that each reflector reflects 50 percent of the energy which is transmitted to it.

At an arbitrary time zero, the seismic source begins to emit a series of six impulses, each of which has a positive amplitude of one. The impulses are emitted in the time sequence shown in FIG. 4B, i.e., at time equal to 0.0, 0.125, 0.375, 0.750, 1.250 and 2.0 seconds, respectively. FIG. 4B is the coded energy signal record or source signature. The coded energy signal has a quality factor of about 3.

As is illustrated in FIG. 4C, the reflected energy from reflector $R_1$ will consist of six impulses of amplitude 0.5 at times of 1.0, 1.25, 1.375, 1.750, 2.250 and 3.0 seconds, respectively, which is essentially a one-half size reproduction of the coded energy signal shifted by the two-way travel time to the reflector $R_1$ of 1.0 seconds. Similarly, FIG. 4D illustrates the reflections from reflector $R_2$ which are essentially a one-fourth size reproduction of the coded energy signal shifted by the two-way travel time of 2.5 seconds. FIG. 4E illustrates the sum of the reflections from each of the reflectors, and is, in fact, the raw, uncorrelated seismic trace which would be sensed by the energy sensing means and recorded by the recording means.

Conventionally, a series of these traces would be obtained using an identical coded energy signal and nearly identical source and sensing means locations. The traces would be vertically stacked in order to increase the amplitude of the reflected signal as compared to the background noise amplitude. For the sake of simplicity there is no background noise and only the single raw trace will be treated. It should be understood, however, that a single, vertically stacked trace compiled by summing a number of individual raw traces from repeated separate transmissions of identical coded energy signals would be processed in precisely the same manner as the individual trace of this example will be hereafter treated.

The raw trace is then crosscorrelated with the source signature. FIG. 4F illustrates the crosscorrelated seismic trace which is obtained by applying the conventional crosscorrelation step known as "shift-summing" to the raw seismic trace of FIG. 4E. The largest individual samples on the crosscorrelated trace are lettered consecutively a through d. The "a" sample is an obvious indication of the reflector $R_1$. There are two "b" samples of equal amplitude, three "c" samples of slightly smaller amplitude and four "d" samples of still slightly smaller amplitude. Without the knowledge of the actual earth strata, as shown in FIG. 4A, one skilled in the art could not with confidence say that the earth strata has only two reflectors, one at 1.0 seconds on the trace and the other at 2.5 seconds on the trace. The correlation residual removal step of the method of this invention will remedy this undesirable situation.

Figure 4G:
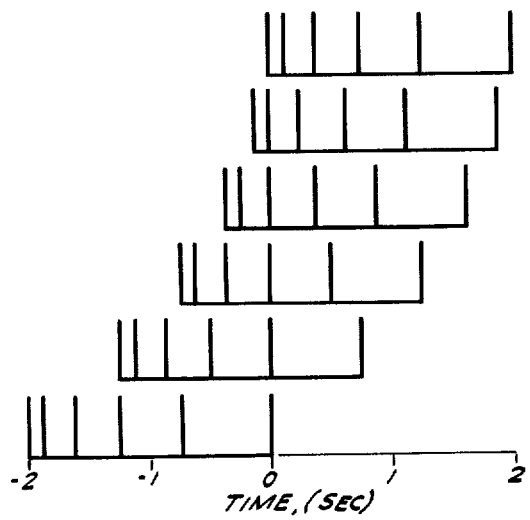
Figure 4H:
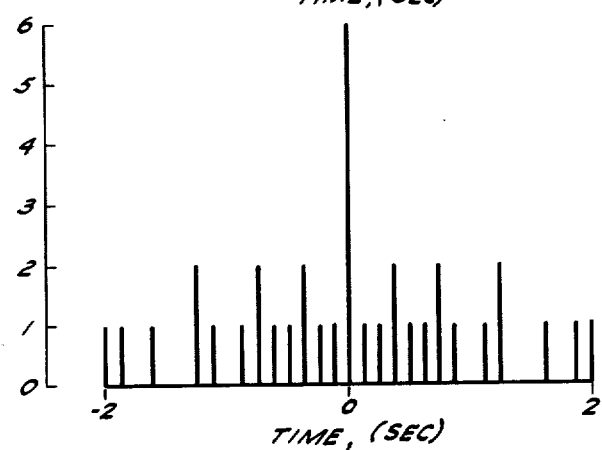

In order to remove the correlation residuals from the crosscorrelated trace, a PSD operator is subtractively applied to the correlated trace. For the coded energy signal of this example, the PSD operator is obtained by shift-summing the source signature as is graphically demonstrated in FIG. 4G and 4H. In FIG. 4G, six copies (one for each of the impulses) of the signature which have each been time-shifted by the respective time break of one of the six impulses, are summed to yield the PSD operator illustrated in FIG. 4H.

The application of the operator to the crosscorrelated trace requires repeated performance of 4 consecutive steps. These steps, as graphically illustrated in FIG. 4I through 4M are as follows:

(1) Locate the seismic sample on the trace which has the largest absolute amplitude, and which has not been previously processed;

(2) Scale the entire PSD operator so that the central, single-largest absolute maximum of the operator is identical in amplitude and polarity to the seismic sample which was located in step (1);

(3) Time-shift the scaled operator so that its central absolute maximum is aligned with the seismic sample located in step (1); and (4) Subtract the scaled operator residuals from the seismic trace, i.e., all of the operator except its central absolute maximum is subtracted from the trace.

FIG. 4I is the correlated seismic trace of FIG. 4F. FIG. 4J graphically illustrates the PSD operator which has been scaled to the amplitude of the largest seismic sample (sample "a" of FIG. 4I) and has been aligned under that sample. FIG. 4K is the resultant seismic trace after having subtracted the residuals of the scaled operator.

In FIG. 4L, the PSD operator is scaled to and aligned under the largest absolute amplitude seismic sample which has not been previously processed, sample "b" of FIG. 4K. FIG. 4M illustrates the resultant seismic trace after the second PSD operator application. The trace of FIG. 4M now has no more non-zero seismic samples which have not been previously processed so the PSD operational steps are completed. In this simplified example only two PSD iterations were required; however, it should be understood that more iterations are required for more complex formations.

The PSD treated trace of FIG. 4M would then be treated for the conventional moveout corrections, which in this case, since there is no reflector dip or static moveout, would involve only normal moveout, and it would then be CDP-stacked with other processed traces, frequency filtered and interpreted according to well-known techniques.

It is readily apparent that the processed trace obtained from the method of this invention (FIG. 4M) is vastly superior to the processed trace (FIG. 4I) which would be obtained using the same coded energy signal in a prior art method.

EXAMPLE 2

Figure 5A:
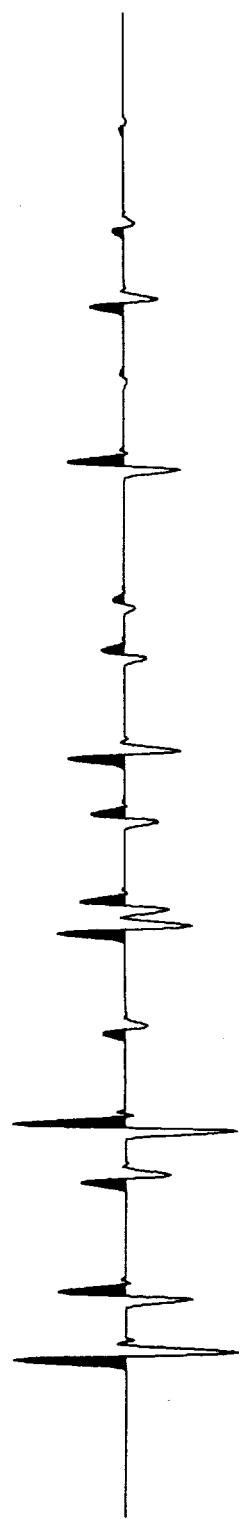
FIGS. 5A through 5F are graphical representations illustrating the seismic data obtained by application of one embodiment of the method of this invention to more complex noise-free earth strata.
Figure 5D:
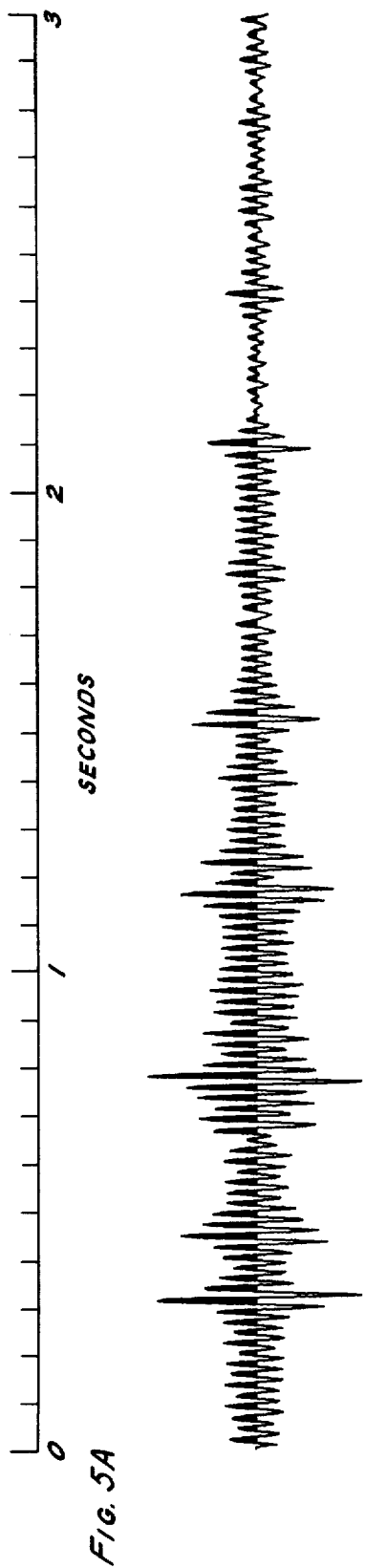
Figure 5F:
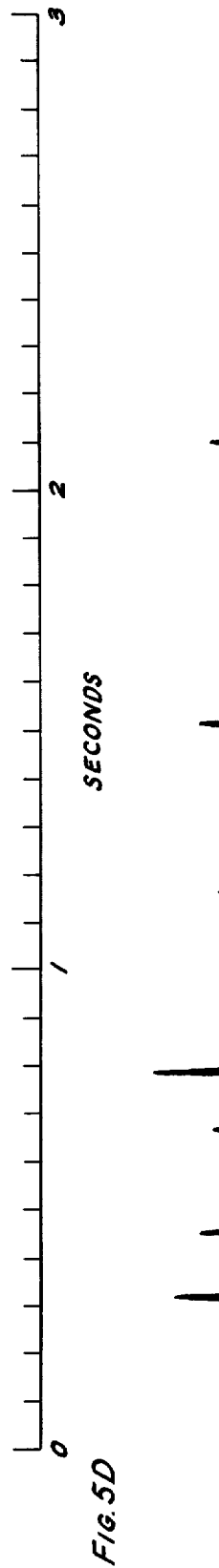
Figure 5B:
Figure 5C:
Figure 5E:
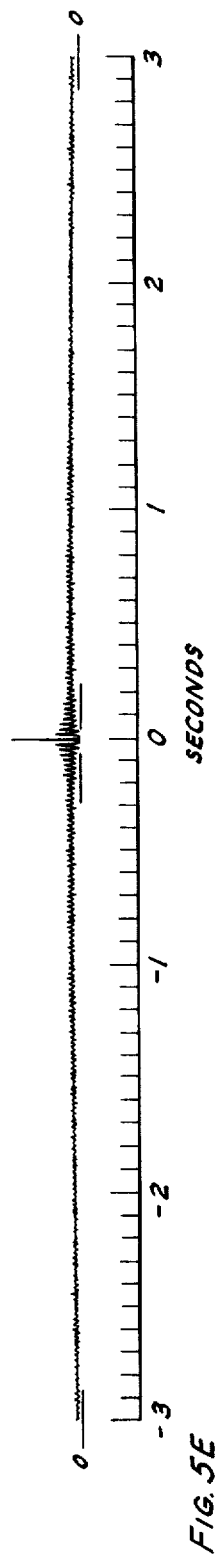

A model trace from a second, more complicated but still noise-free formation is illustrated in FIG. 5A. According to the method of this invention, 16 separate coded energy signals having quality factors of about 3 and having substantially identical source signatures (illustrated in FIG. 5B) are transmitted into the model formation. The 16 raw, uncorrelated traces (one of which is shown in FIG. 5C) and the source signature are processed according to the method of this invention as illustrated in FIG. 2, i.e., the 16 traces are vertically stacked then crosscorrelated with the source signature, and the PSD operator, (FIG. 5E), derived from the autocorrelation of the source signature, is subtractively applied to the correlated, vertically stacked trace. FIG. 5D illustrates the conventionally correlated and vetically-stacked seismic trace before PSD processing, and FIG. 5F illustrates the seismic trace after 200 iterations of PSD processing. It is readily apparent that the seismic trace obtained by the novel PSD processing of the method of this invention is much superior to the conventionally processed trace of FIG. 5D.

EXAMPLE 3

To generate a more realistic model, filtered random noise is added to the formation of Example 2. Sixteen (16) raw seismic traces are generated by separate transmission of 16 different coded energy signals having quality factors between about 2 and about 10 into the formation, to which has been added a different random noise pattern for each of the transmission sweeps. The random noise was added in a filtered 10-15-60-65 Hz band pass in sufficient amplitude to give a 1.0 signal-to-noise ratio. A signature of one of the coded energy signals is illustrated in FIG. 6B.

Figure 6A:
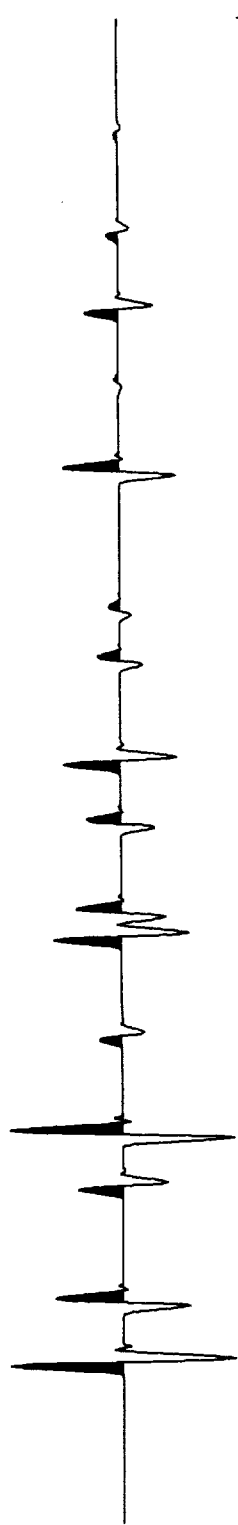
FIGS. 6A through 6G are graphical representations illustrating the seismic data obtained by application of an embodiment of the method of this invention to complex earth strata containing added random noise.
Figure 6D:
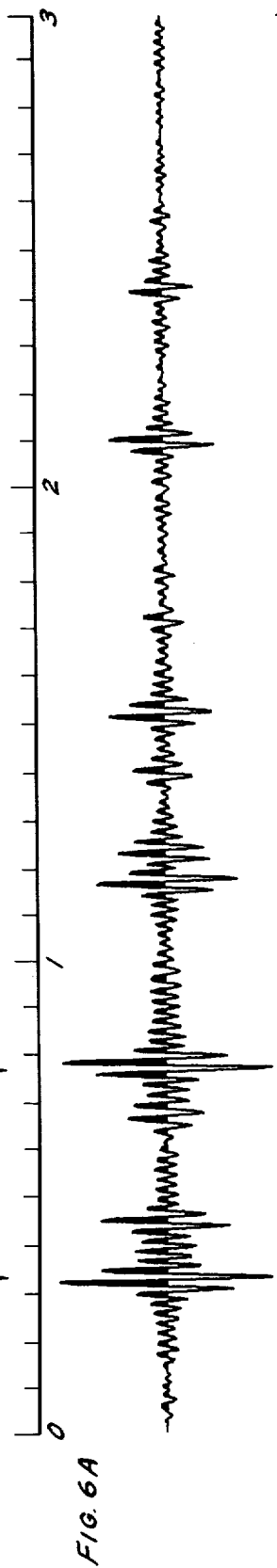
Figure 6F:
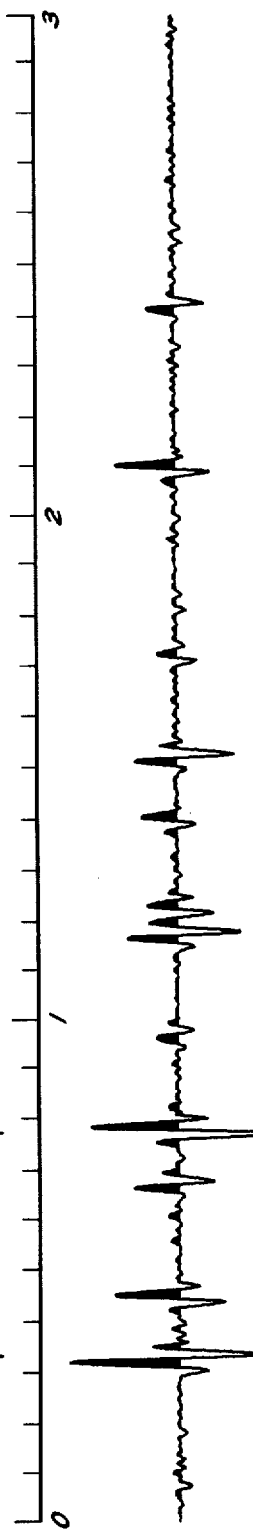
Figure 6G:
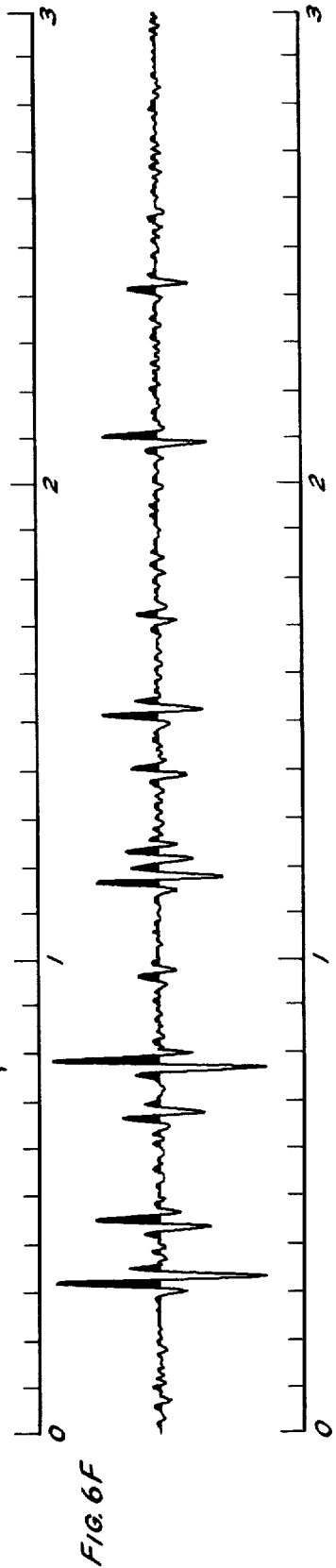
Figure 6B:
Figure 6C:
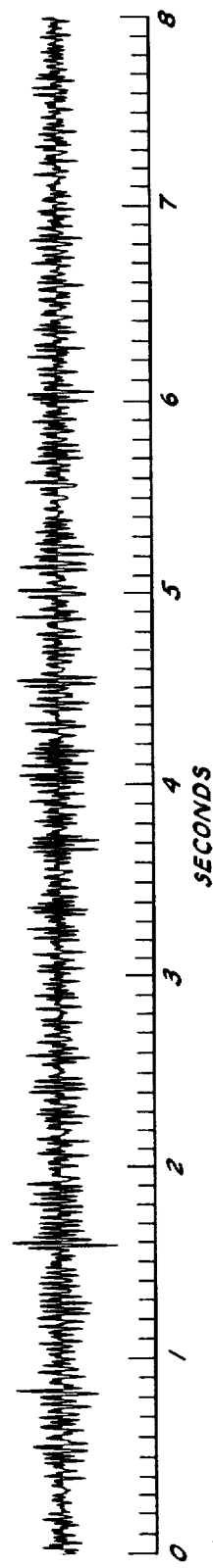
Figure 6E:
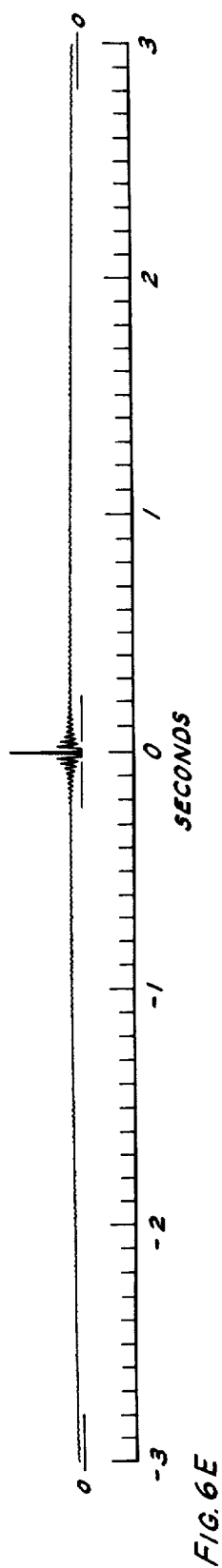

Each of the raw seismic traces (one of which is illustrated in FIG. 6C) is crosscorrelated with its own source signature and then vertically stacked with the other cross-correlated traces. A stacked PSD operator (illustrated in FIG. 6E) is derived by separately autocorrelating each of the source signatures and then vertically stacking these individual PSD operators. This data processing method is schematically illustrated, for the processing of traces from three source signatures, in FIG. 3.

FIG. 6A illustrates the model trace for the formation of this example with no noise. FIG. 6D illustrates the vertically stacked, individually crosscorrelated seismic traces with the random noise before PSD processing. FIG. 6G illustrates the seismic trace after 200 PSD iterations with the "stacked" PSD operator. The seismic trace obtained by the method of this invention (FIG. 6G) is superior in quality to the trace which would be obtained if these coded energy signals were used in the prior art methods (FIG. 6D).

EXAMPLE 4

In a less preferred embodiment, each of the sixteen crosscorrelated traces of Example 3 are processed with their individual PSD operators by 200 iterations prior to being vertically stacked. The resulting trace is illustrated in FIG. 6F. This embodiment required 3200 iterations as compared to the 200 iterations of Example 3.

It is readily apparent that the seismic trace obtained by either of these methods of this invention (FIGS. 6G and 6F) is superior in quality to the seismic trace (FIG. 6D) obtained using the data processing steps of the prior art methods.

EXAMPLE 5

Figure 7B:
Figure 7C:
Figure 7E:

A frequency variable coded energy signal, A(t), where:

$$A(t) = A_o \sin\left[2\pi(f_o t + \left[\frac{(f_f - f_o)}{2T}\right] t^2)\right]$$

and $f_o = 10$ Hz, $f_f = 48$ Hz, $T = 10$ sec.

is transmitted into the formation model illustrated in FIG. 7A to which has been added random noise in a filtered 5-10-50-55 Hz bandpass with a signal-to-noise ratio of 0.5. The coded energy signal has a quality factor of about 2.2. The signature of the source code is illustrated in FIG. 7B and the resulting raw seismic trace with noise is shown in FIG. 7C. The source signature and raw seismic trace are crosscorrelated to produce the crosscorrelated trace of FIG. 7D. The source signature is autocorrelated to give the predictive operator illustrated in FIG. 7E. The predictive operator is subtractively applied to the crosscorrelated trace 200 times, thereby producing the PSD treated trace of FIG. 7F. The PSD treated trace (FIG. 7F) is superior in quality to the conventionally processed trace (FIG. 7D).

EXAMPLE 6

A seismic survey of a parcel of land is conducted in accordance with the method of this invention. A seismic source and several geophone arrays are systematically positioned at successive sourcepoints and sensor locations to provide a multifold subsurface coverage. At each sourcepoint the siesmic source separately generates a plurality of coded energy signals, each having a quality factor between about 1.5 and about 20, and transmits these signals into the earth. The geophones sense the energy reflected from within the earth and a large number of raw seismic traces are recorded along with signatures of the coded energy signals. Subsequently the raw seismic traces are each crosscorrelated with the corresponding source signature and each source signature is autocorrelated to produce a plurality of crosscorrelated traces and predictive operators. The predictive operators are subtractively applied to the corresponding crosscorrelated traces to remove the correlation residuals thereby producing high quality processed time traces.

The time traces are interpreted using geophysical principles to construct depth maps and cross sections of the probable geological structure of the land. A stratigraphic trap of appreciable size is indicated by the depth maps and cross sections and, accordingly, a well site is selected for drilling a well into the stratigraphic trap. A borehole is drilled into the stratigraphic trap using conventional drilling techniques. A commercially significant quantity of petroleum is found in the stratigraphic trap and the borehole is completed as an oil production well.

While particular embodiments of the invention have been described, it will be understood, of course, that the invention is not limited thereto since many obvious modifications can be made, and it is intended to include within this invention any such modifications as will fall within the scope of the claims.

Having now described the invention, I claim:

1. A method for seismic exploration of the earth comprising the steps of:
   (1) generating a frequency variable coded energy signal characterized by an autocorrelation function having a central, single-largest absolute maximum which is at least about 1.2 times the absolute amplitude of the next largest absolute maximum of the autocorrelation function, and transmitting said coded energy signal into the earth;
   (2) sensing the energy emitted from within the earth;
   (3) recording a raw seismic trace which is proportional to the energy sensed in step (2);
   (4) recording a source signature which is proportional to said coded energy signal;
   (5) crosscorrelating said seismic trace with said source signature, thereby forming a crosscorrelated trace comprised of a plurality of seismic samples defining a plurality of seismic events and correlation residuals;
   (6) autocorrelating said source signature, thereby forming a primary predictive operator comprising a central, single-largest absolute maximum and a plurality of predictive residuals; and
   (7) subtractively applying said primary predictive operator to said crosscorrelated trace, whereby said correlation residuals are predictively subtracted from said crosscorrelated trace to produce a high quality processed trace on which said seismic events are identifiable.

2. The method defined in claim 1 wherein the frequency variance of the coded energy signal generated in step (1) is controlled such that the coded energy signal is characterized by an autocorrelation function having a central, single-largest absolute maximum which is between about 2 and about 10 times the absolute amplitude of the next largest absolute maximum of the autocorrelation function.

3. The method as defined in claim 1 wherein said primary predictive operator is subtractively applied to said crosscorrelated trace by repetitive application of a series of consecutive steps comprising:
   (a) scanning said crosscorrelated trace for the largest absolute amplitude seismic sample not previously treated;
   (b) scaling said primary predictive operator by the ratio of the amplitude of said seismic sample not previously treated to the amplitude of said central, single-largest absolute maximum of said primary predictive operator, thereby forming a scaled secondary predictive operator comprising a central, single-largest absolute maximum individually scaled to said seismic event not previously treated and a plurality of scaled predictive residuals;
   (c) aligning said central absolute maximum of said individually scaled secondary predictive operator with said seismic sample not previously treated; and
   (d) treating said seismic sample by subtracting said predictive residuals of said scaled secondary predictive operator from said crosscorrelated trace.

4. The method defined in claim 3 wherein said crosscorrelated trace is treated by from about 1 to about 3,000 iterations of said consecutive steps (a) through (d) per second of length of said crosscorrelated trace.

5. The method defined in claim 1 further including the steps of: (8) interpreting said processed trace using geophysical principles, thereby identifying at least one subterranean mineral deposit of interest; (9) selecting, based on the interpretation made in step (8), a well site from which to drill a well into said mineral deposit of interest; and (10) drilling a well from said well site into said mineral deposit of interest.

6. A method for seismic exploration of the earth comprising the steps of:
   (1) generating a frequency variable coded energy signal characterized by an autocorrelation function having a central, single-largest absolute maximum which is between about 1.5 and about 20 times the absolute amplitude of the next largest absolute maximum of the autocorrelation function, and transmitting said coded energy signal into the earth;
   (2) sensing the energy emitted from within the earth;
   (3) recording a raw seismic trace which is proportional to the energy sensed in step (2);
   (4) recording a source signature which is proportional to said coded energy signal;
   (5) crosscorrelating said seismic trace with said source signature, thereby forming a crosscorrelated trace comprised of a plurality of seismic samples defining a plurality of seismic events and correlation residuals;
   (6) autocorrelating said source signature, thereby forming a primary predictive operator comprising a central, single-largest absolute maximum and a plurality of predictive residuals; and (7) treating said crosscorrelated trace by from about 10 to about 500 iterations, per second of length of said crosscorrelated trace, of the consecutive steps comprising:

(a) scanning said crosscorrelated trace for the largest absolute amplitude seismic sample not previously treated;
  (b) scaling said primary predictive operator by the ratio of the amplitude of said seismic sample not previously treated to the amplitude of said central, single-largest absolute maximum of said primary predictive operator, thereby forming a scaled secondary predictive operator comprising a central, single-largest absolute maximum individually scaled to said seismic event not previously treated and a plurality of scaled predictive residuals;
  (c) aligning said central absolute maximum of said individually scaled secondary predictive operator with said seismic sample not previously treated; and
  (d) treating said seismic sample by subtracting said predictive residuals of said scaled secondary predictive operator from said crosscorrelated trace, whereby said correlation residuals are predictively subtracted from said crosscorrelated trace to produce a high quality processed trace on which said seismic events are identifiable.

7. The method defined in claim 6 wherein the frequency variance of the coded energy signal generated in step (1) is controlled such that the coded energy signal is characterized by an autocorrelation function having a central, single-largest absolute maximum which is between about 2 and about 10 times the absolute amplitude of the next largest absolute maximum of the autocorrelation function.

8. The method defined in claim 6 further including the steps of: (8) interpreting said processed trace using geophysical principles, thereby identifying at least one subterranean mineral deposit of interest; (9) selecting, based on the interpretation made in step (8), a well site from which to drill a well into said mineral deposit of interest; and (10) drilling a well from said well site into said mineral deposit of interest.

9. A method for seismic exploration of the earth comprising the steps of:

(1) generating a frequency variable coded train comprised of a plurality of constant polarity and substantially constant amplitude impulses, and characterized by an autocorrelation function having a central, single-largest absolute maximum which is between about 1.5 and about 20 times the absolute amplitude of the next largest absolute maximum of the autocorrelation function, and transmitting said coded train into the earth;
  (2) sensing and periodically sampling the energy emitted from within the earth to form a plurality of sensed energy samples;
  (3) automatically shift-summing said sensed energy samples according to the code of said coded train to form a shift-summed trace comprised of a plurality of seismic samples which define a plurality of seismic events and correlation residuals;
  (4) forming a plurality of source code samples proportional to the code of said coded train;
  (5) automatically shift-summing said source code samples to form a partial predictive operator comprising a single-largest absolute maximum and a first unsymmetrical plurality of predictive residuals;
  (6) adding to said partial predictive operator a second unsymmetrical plurality of predictive residuals comprising a mirror image of said first unsymmetrical plurality of predictive residuals, thereby forming a primary predictive operator comprising a central, single-largest absolute maximum and a symmetrical plurality of predictive residuals; and
  (7) subtractively applying said primary predictive operator to said shift-summed trace; whereby said correlation residuals are predictively subtracted from said shift-summed trace to produce a high quality processed trace on which said seismic events are identifiable.

10. The method defined in claim 9 wherein the frequency variance of the coded train generated in step (1) is controlled such that the coded train is characterized by an autocorrelation function having a central, single-largest absolute maximum which is between about 2 and about 10 times the absolute amplitude of the next largest absolute maximum of the autocorrelation function.

11. The method defined in claim 9 wherein said primary predictive operator is subtractively applied to said shift-summed trace by between about 10 and about 500 iterations, per second of length of said shift-summed trace, of the consecutive steps comprising:

(a) scanning said shift-summed trace for the largest absolute amplitude seismic sample not previously treated;
  (b) scaling said primary predictive operator by the ratio of the amplitude of said seismic sample not previously treated to the amplitude of said central, single-largest absolute maximum of said primary predictive operator, thereby forming a scaled secondary predictive operator comprising a central, single-largest absolute maximum individually scaled to said seismic event not previously treated and a plurality of scaled predictive residuals;
  (c) aligning said central absolute maximum of said individually scaled secondary predictive operator with said seismic sample not previously treated; and
  (d) treating said seismic sample by subtracting said predictive residuals of said scaled secondary predictive operator from said shift-summed trace.

12. The method defined in claim 9 further including the steps of: (8) interpreting said processed trace using geophysical principles, thereby identifying at least one subterranean mineral deposit of interest; (9) selecting, based on the interpretation made in step (8), a well site from which to drill a well into said mineral deposit of interest; and (10) drilling a well from said well site into said mineral deposit of interest.

13. A method for seismic exploration of the earth comprising the steps of:

(1) separately generating a plurality of frequency variable coded energy signals each characterized by an autocorrelation function having a central, single-largest absolute maximum which is between about 1.5 and about 20 times the absolute amplitude of the next largest absolute maximum of the autocorrelation function, and separately transmitting said coded energy signals into the earth from substantially the same sourcepoint;

(2) sensing the energy emitted from within the earth;

(3) recording a plurality of raw seismic traces which are proportional to the energy sensed in step (2), each of said raw seismic traces corresponding to one of said coded energy signals;

(4) recording a plurality of source signatures, each of which is proportional to one of said coded energy signals;

(5) crosscorrelating each of said seismic traces with one of said source signatures, which seismic trace and source signature correspond to the same coded energy signal, thereby forming a plurality of crosscorrelated traces;

(6) vertical-stacking said plurality of crosscorrelated traces, thereby forming a stacked trace comprised of a plurality of seismic samples defining a plurality of seismic events and correlation residuals;

(7) autocorrelating each of said source signatures thereby forming a plurality of autocorrelation functions;

(8) vertical-stacking said plurality of autocorrelation functions thereby forming a stacked predictive operator comprising a central, single-largest absolute maximum and a plurality of predictive residuals; and (9) subtractively applying said stacked predictive operator to said stacked trace; whereby said correlation residuals are predictively subtracted from said stacked trace to produce a high quality processed trace on which said seismic events are identifiable.

14. The method defined in claim 13 wherein the frequency variance of each of the coded energy signals generated in step (1) is controlled such that each coded energy signal is characterized by an autocorrelation function having a central, single-largest absolute maximum which is between about 2 and about 10 times the absolute amplitude of the next largest absolute maximum of the autocorrelation function.

15. The method as defined in claim 13 wherein said stacked predictive operator is subtractively applied to said stacked trace by repetitive application of a series of consecutive steps comprising:

(a) scanning said stacked trace for the largest absolute amplitude seismic sample not previously treated;

(b) scaling said stacked predictive operator by the ratio of the amplitude of said seismic sample not previously treated to the amplitude of said central, single-largest absolute maximum of said stacked predictive operator, thereby forming a scaled secondary predictive operator comprising a central, single-largest absolute maximum individually scaled to said seismic event not previously treated and a plurality of scaled predictive residuals;

(c) aligning said central absolute maximum of said individually scaled secondary predictive operator with said seismic sample not previously treated; and (d) treating said seismic sample by subtracting said predictive residuals of said scaled secondary predictive operator from said stacked trace.

16. The method defined in claim 15 wherein said stacked trace is treated by from about 1 to about 3,000 iterations of said consecutive steps (a) through (d) per second of length of said stacked trace.

17. The method defined in claim 13 further including the steps of: (10) interpreting said processed trace using geophysical principles, thereby identifying at least one subterranean mineral depsit of interest; (11) selecting, based upon the interpretation made in step (10), a well site from which to drill a well into said mineral deposit of interest; and (12) drilling a well from said well site into said mineral deposit of interest.

18. The method defined in claim 1 or 6 wherein the frequency variance of said coded energy signal is controlled such that said coded energy signal is characterized by an autocorrelation function having a central, single-largest absolute maximum which is about 3 times the absolute amplitude of the next largest absolute maximum of the autocorrelation function.

19. The method defined in claim 9 wherein the frequency variance of said coded train is controlled such that said coded train is characterized by an autocorrelation function having a central, single-largest absolute maximum which is about 3 times the absolute amplitude of the next largest absolute maximum of the autocorrelation function.

20. The method defined in claim 13 wherein the frequency variance of each of said coded energy signals is controlled such that each coded energy signal is characterized by an autocorrelation function having a central, single-largest absolute maximum which is about 3 times the absolute amplitude of the next largest absolute maximum of the autocorrelation function.

* * * * *